C. MILLER.
Pruning-Implement.
No. 160.454. Patented March 2, 1875.
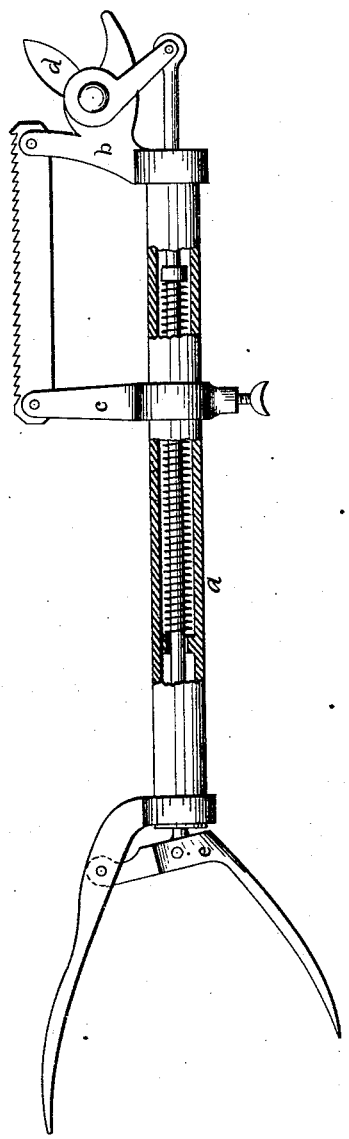
WITNESSES:
Christian Wagner
William H. Wagner
INVENTOR:
Charles Miller

UNITED STATES PATENT OFFICE.

CHARLES MILLER, OF BOONVILLE, MISSOURI.

IMPROVEMENT IN PRUNING IMPLEMENTS.

Specification forming part of Letters Patent No. 160,454, dated March 2, 1875; application filed August 3, 1874.

CASE B.

*To all whom it may concern:*

Be it known that I, CHARLES MILLER, of Boonville, in the county of Cooper and State of Missouri, have invented a new and Improved Implement for Pruning and Hedge-Trimming Purposes; and I do hereby declare that the following is a full and exact description of the said invention.

This invention is an improvement on a patent granted to me, No. 152,759, issued July 7, 1874; and it chiefly consists in the lower adjustable saw-arm, which admits any length of saw, and fastens with a set-screw in the attachment of an ordinary pair of shears, which is more durable and cheaper in construction.

$a$ is a hollow tube, with slotted handle on one end and saw-arm $b$ on the other, which at the same time forms the resisting half of a pair of shears. $c$ is an adjustable saw-arm, to receive a saw-blade of any length. The arm $c$ is adjustable by means of a ferrule slipping on the tube $a$, and fastened with a set-screw. $d$ is the cutting-edge of the other half of the shears, and works on a bolt or rivet, in connection with arm $b$, like an ordinary pair of shears. Its extending-lever connects with a rod by means of a joint, which rod passes through the hollow tube. A solid rod could be used instead of hollow, and passed along the side of it or through a groove, and connects at the other end with a movable handle, $e$, thus giving motion to the shears when operated. The handle $e$ is connected with the slotted handle on tube $a$ by another joint. The connection-rod of shear $d$ and handle $e$ has a coil-spring, which bears against a shoulder on the connection-rod, and another on the tube, to drive the shear back again without aid, thus forming an instrument (shear) attached to one end of a tube, bar, or pole, and operated by another rod running parallel with it.

I claim—

The combination of shear-blades, saw with its adjustable arm, and tubular metal support $a$, all arranged as shown.

CHARLES MILLER.

Witnesses:
 CHRISTIAN WAGNER,
 WILLIAM H. WAGNER.